United States Patent
Woo

(10) Patent No.: US 10,250,063 B2
(45) Date of Patent: Apr. 2, 2019

(54) WIRELESS CHARGING DEVICE AND SYSTEM FOR WEARABLE DEVICE

(71) Applicant: SAMSUNG SDI CO., LTD., Yongin-si, Gyeonggi-do (KR)

(72) Inventor: Seungwon Woo, Yongin-si (KR)

(73) Assignee: SAMSUNG SDI CO., LTD., Yongin-si, Gyeonggi-do (KR)

(*) Notice: Subject to any disclaimer, the term of this patent is extended or adjusted under 35 U.S.C. 154(b) by 848 days.

(21) Appl. No.: 14/666,710

(22) Filed: Mar. 24, 2015

(65) Prior Publication Data
US 2016/0190854 A1 Jun. 30, 2016

(30) Foreign Application Priority Data
Dec. 24, 2014 (KR) .................. 10-2014-0188458

(51) Int. Cl.
*H02J 50/12* (2016.01)
*H02J 7/02* (2016.01)
*H02J 50/40* (2016.01)

(52) U.S. Cl.
CPC .............. *H02J 7/025* (2013.01); *H02J 50/12* (2016.02); *H02J 50/40* (2016.02)

(58) Field of Classification Search
CPC .. H02J 50/10; H02J 50/12; H02J 50/20; H02J 50/40
See application file for complete search history.

(56) References Cited

U.S. PATENT DOCUMENTS

| 6,127,799 | A | * | 10/2000 | Krishnan | G06K 19/0701 320/104 |
| 7,868,482 | B2 | * | 1/2011 | Greene | H02J 1/10 307/82 |
| 8,129,862 | B2 | * | 3/2012 | Audy | H02J 1/10 307/80 |
| 9,231,665 | B2 | * | 1/2016 | Liao | H04B 5/0037 |
| 2007/0273216 | A1 | * | 11/2007 | Farbarik | H02J 1/10 307/86 |
| 2008/0054638 | A1 | * | 3/2008 | Greene | H02J 50/10 290/1 R |
| 2009/0067208 | A1 | * | 3/2009 | Martin | H02J 17/00 363/126 |
| 2010/0109445 | A1 | * | 5/2010 | Kurs | B60L 11/007 307/104 |

(Continued)

FOREIGN PATENT DOCUMENTS

JP 2014180078 A 9/2014
KR 10-2005-0098474 A 10/2005
(Continued)

*Primary Examiner* — Fritz M Fleming
(74) *Attorney, Agent, or Firm* — Lee & Morse, P.C.

(57) ABSTRACT

A wireless charging device includes a plurality of antennas, a plurality of AC/DC converters, and a controller. The antennas receive power, are located at different positions of an electronic device, and are oriented in different directions. The AC/DC converters are connected to respective ones of the antennas and convert AC signals from the antennas to DC signals. The controller measures intensities of the converted signals from the AC/DC converters, compares the intensities, and selects one of the antennas having a greater intensity for charging a battery.

19 Claims, 6 Drawing Sheets

(56) References Cited

U.S. PATENT DOCUMENTS

| | | | |
|---|---|---|---|
| 2011/0175461 A1* | 7/2011 | Tinaphong | H02J 17/00 307/149 |
| 2011/0241948 A1* | 10/2011 | Bevelacqua | H01Q 1/243 343/702 |
| 2012/0030494 A1* | 2/2012 | Yu | H03K 17/693 713/340 |
| 2013/0058380 A1* | 3/2013 | Kim | H02J 50/90 375/146 |
| 2014/0152114 A1* | 6/2014 | Kim | H04B 5/0093 307/104 |
| 2014/0266031 A1 | 9/2014 | Sasaki | |
| 2014/0285140 A1 | 9/2014 | Jung | |

FOREIGN PATENT DOCUMENTS

| KR | 10-2014-0114682 A | | 9/2014 |
|---|---|---|---|
| KR | 10-2014-0120786 A | | 10/2014 |
| KR | 20140120786 A | * | 10/2014 |

* cited by examiner

WIRELESS CHARGING DEVICE AND SYSTEM FOR WEARABLE DEVICE

CROSS-REFERENCE TO RELATED APPLICATION

Korean Patent Application No. 10-2014-0188458, filed on Dec. 24, 2014, and entitled, "Wireless Charging Device and System for Wearable Device," is incorporated by reference herein in its entirety.

BACKGROUND

1. Field

One or more embodiments described herein relate to a wireless charging device and system for an electronic device, e.g., a portable or wearable electronic device.

2. Description of the Related Art

Wireless recharging refers to wirelessly recharging a battery. The battery may power, for example, a portable electronic device or another type of system or device. Wireless recharging may be performed by placing the battery on a charger, such as a charging pad. The battery is recharged wirelessly (e.g., without establishing a physical connection to a charging adapter or a power cable). Wireless recharging is also known as non-contact recharging.

In one arrangement, wireless recharging of a portable electronic device is performed in a one-to-one electromagnetically inductive manner between a primary coil of the portable electronic device and a secondary coil of a charger. However, since portable electronic devices (and especially wearable portable devices) have many different structures (e.g., curved, bent, etc.), it is quite difficult to charge the device using the one-to-one electromagnetically inductive method. For example, when the primary coil of the portable electronic device is not sufficiently close to the secondary coil of the charger due to bend or curve in the device, charging efficiency may be lowered or charging may not be properly achieved.

SUMMARY

In accordance with one or more embodiments, a wireless charging device includes a plurality of antennas to wirelessly receive power, the antennas located at different positions of an electronic device and oriented in different directions; a plurality of AC/DC converters connected to respective ones of the antennas, the AC/DC converters to convert AC signals from the antennas to DC signals; and a controller to measure intensities of the converted signals from the AC/DC converters, compare the intensities, and select one of the antennas having a greater intensity for charging a battery.

The plurality of antenna matching circuits may be connected between the antennas and the AC/DC converters, the antenna matching circuits to perform antenna impedance matching for receiving power based on the signals from the antennas. The device may include a plurality of switches connected between the antennas and the antennas matching circuits.

The controller may control the switches to select the antenna having the greater intensity. The controller may constantly measure signal intensity from the selected antenna while charging the battery, and turn ON the switches to measure the intensities of the signals from the antenna matching circuits when the signal intensity of the selected antenna changes, the controller to compare the measured intensities from the antenna matching circuits and to select a different one of the antennas having the greater signal intensity based on the comparison. The antennas may be at different positions of a curved surface of the electronic device. The antennas may be flexible printed circuit board type. Each of the antenna matching circuits may include an inductor connected in parallel to a first capacitor.

Each of the AC/DC converters may include a plurality of AC/DC conversion sub circuits connected in parallel, and each of the AC/DC conversion sub circuits may include a second capacitor having a first terminal connected to a first terminal of the first capacitor; a first diode having a cathode electrode connected to a second terminal of the second capacitor and an anode electrode connected to a second terminal of the first capacitor and a reference terminal; a third capacitor having a first terminal connected to the anode electrode of the first diode; and a second diode having a cathode electrode connected to a second terminal of the third capacitor and an anode electrode connected to the cathode electrode connected to the first diode.

In accordance with one or more other embodiments, an apparatus includes an interface; and a controller to receive power signals from a plurality of antennas through the interface, the controller to select at least one antenna based on the power signals and to control charging of a battery of an electronic device based on the power signal from the at least one antenna, wherein the power signals from the antennas have different levels based on different positions of the antennas on the electronic device.

The controller may select only one of the antennas based on the power signals to control charging of the battery. The controller may simultaneously select more than one antenna based on the power signals to control charging of the battery. The controller may select another one of the antennas when the power signal of the at least one selected antenna falls below a predetermined level, the controller to control continued charging of the battery based on the power signal from the other selected antenna.

The controller may monitor the power signals of the antennas during battery charging, and select another one of the antennas when the level of power signal of the at least one selected antenna is lower than the level of the other one of the antennas, the controller to control continued charging of the battery based on the power signal from the other selected antenna. The electronic device may be a wearable electronic device. The antennas maybe flexible printed circuit board antennas. The apparatus may be included in the electronic device.

In accordance with one or more other embodiments, an apparatus includes first logic to receive power signals from a plurality of antennas; second logic to compare the power signals from the antennas; and third logic to select at least one antenna based on the comparison, the third logic to control charging of a battery of an electronic device based on the power signal from the at least one antenna, wherein the power signals from the antennas have different levels based on different positions of the antennas on the electronic device. At least one of the first logic, the second logic, or the third logic may be based on one or more instructions to be executed by a circuit.

After the third logic selects the at least one antenna, the first logic may receive power signals from the antennas, the second logic may compare the power signals from the antennas, and the third logic may select a different one of the antennas based on the comparison, the third logic to control continued charging of the battery based on the power signal from the selected different one of the antennas.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
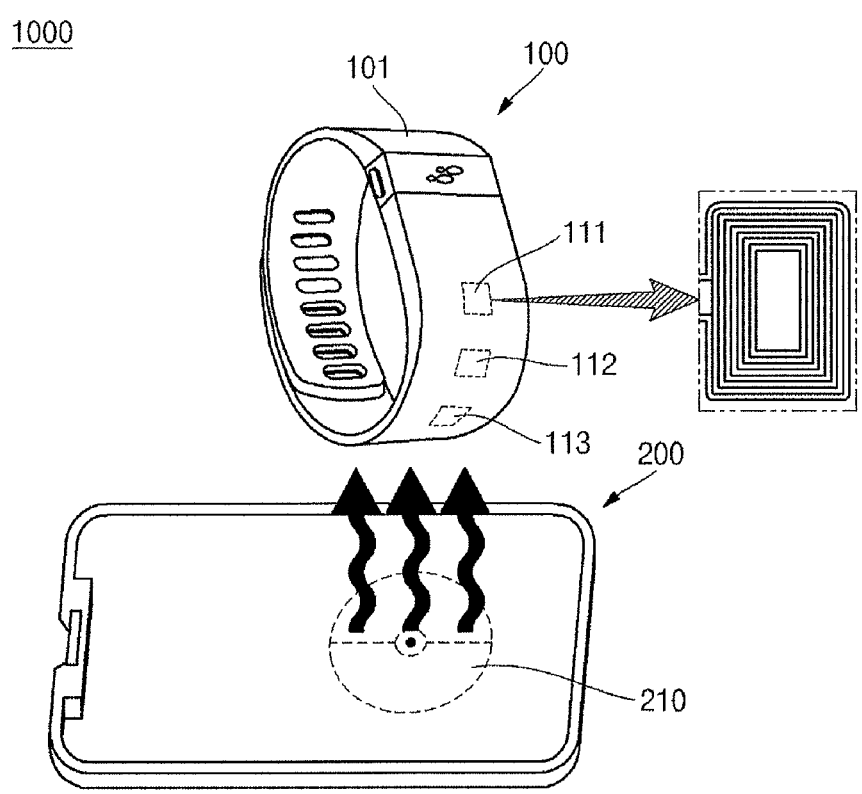
FIG. 1 illustrates an embodiment of a wireless charging system.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
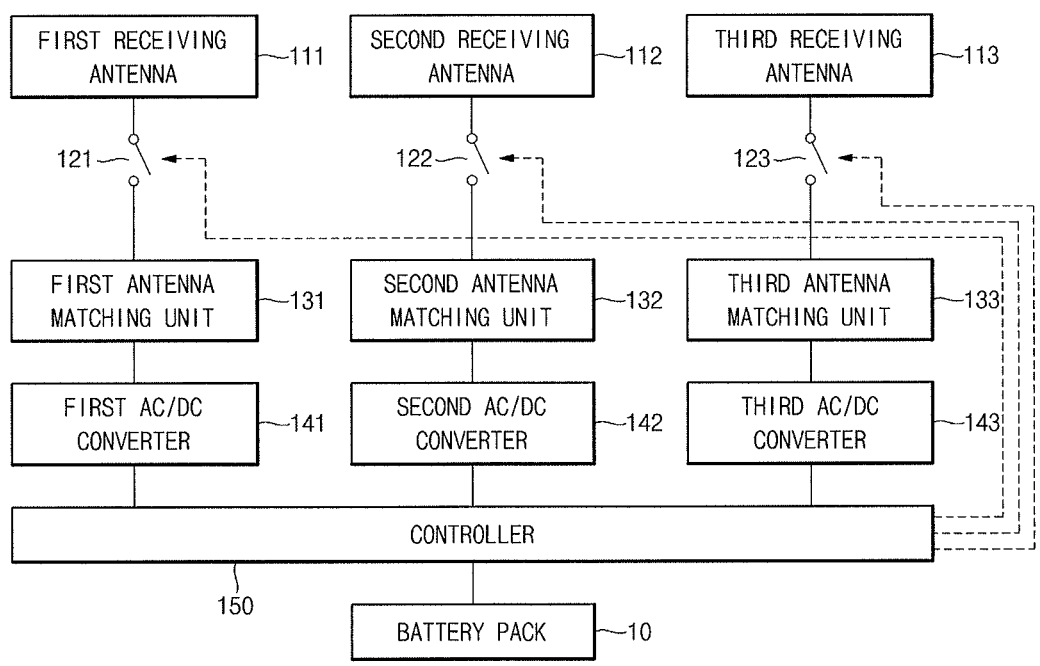
FIG. 2 illustrates an embodiment of a wireless charging device.

FIG. 1 illustrates an embodiment of a wireless charging system 1000 for an electronic device. The electronic device may be a portable device or another type of device which may or may not be wearable. According to one example, the electronic device is a wearable device 101. FIG. 2 illustrates an embodiment of a wireless charging device 100 for the wearable device 101.

Referring to FIGS. 1 and 2, the wireless charging system 1000 includes the wireless charging device 100 and a power supply unit 200. The wireless charging device 100 is installed in or coupled to the wearable device 101 and may include a plurality of receiving antennas 111, 112, and 113, a plurality of switches 121, 122, and 123, a plurality of antenna matching units 131, 132 and 133, a plurality of AC/DC converters 141, 142, and 143, and a controller 150.

The receiving antennas 111, 112, and 113 include first to third receiving antennas 111, 112, and 113. The first to third receiving antennas 111, 112 and 113 are at different positions of the wearable device 101 and, for example, may point in different directions. For example, when the wearable device 101 is a wristwatch-type of device, the first to third receiving antennas 111, 112, and 113 may be disposed at different locations on a curved wristband portion at regular or irregular intervals. Each of the first to third receiving antennas 111, 112, and 113 may be, for example, a flexible printed circuit board (FPCB) type.

The first to third receiving antennas 111, 112, and 113 are located on or in the wearable device 101 and receive power signals from the power supply unit 200 at different positions of the wearable device 101, respectively. In one embodiment, three receiving antennas are illustrated. However, a different number of receiving antennas may be included in another embodiment.

The switches 121, 122, and 123 include first to third switches 121, 122, and 123 which are connected to the first to third receiving antennas 111, 112, and 113, respectively. The first to third switches 121, 122, and 123 are turned ON/OFF based on control signals from the controller 150. For example, each of the first to third switches 121, 122, and 123 may include a metal oxide semiconductor field effect transistor (MOSFET) which is turned ON or OFF by an electrically high or low signal. In this embodiment, three switches are illustrated. In another embodiment, a different number of switches may be included, which, for example, may or may not correspond to the number of the receiving antennas.

The antenna matching units 131, 132, and 133 include first to third antenna matching units 131, 132 and 133 connected to the first to third switches 121, 122, and 123, respectively. The first to third antenna matching units 131, 132, and 133 perform antenna impedance matching to allow a predetermined (e.g., maximum) power of each of the signals to be received through the first to third receiving antenna 111, 112, and 113. In FIG. 2, three antenna matching units are illustrated. However, a different number of antenna matching units may be included in another embodiment. The number of antenna matching units may, for example, correspond to the number of receiving antennas and/or switches.

The AC/DC converters 141, 142, and 143 include first to third AC/DC converters 141, 142, and 143 connected to the first to third antenna matching units 131, 132, and 133, respectively. The first to third AC/DC converters 141, 142, and 143 convert AC signals, which have undergone antenna impedance matching by the first to third antenna matching units 131, 132, and 133, into DC signals and rectify the converted signals. In FIG. 2, three AC/DC converters are illustrated. However, a different number of AC/DC converters may be included in another embodiment. The number of AC/DC converters may, for example, correspond to the number of antenna matching units, receiving antennas, and/or switches. Also, in one embodiment, one or more of the switches, antenna matching units, or converters may be considered an interface of the controller. In one embodiment, the controller interface may include or correspond to one or more leads, ports, or inputs of a chip or other circuit of the controller.

The controller 150 measures intensities of the signals output from the first to third AC/DC converters 141, 142, and 143, and compares the measured signal intensities with one another. Based on a result of the comparison, the controller 150 selects the receiving antenna having the greatest signal intensity as the one through which power is to be received. The controller 150 controls the switches to be turned ON/OFF to receive this power for purposes of charging a battery.

For example, when the signal received through the first receiving antenna 111 has the greatest intensity, the controller 150 controls the second and third switches 122 and 123 to be turned OFF and controls the first switch 121 to remain in an ON state. As a result, charging of the battery is performed based on power received through the first receiving antenna 111. The selected antenna may be the one closest to a transmitting antenna 210 of the power supply unit 200, among the antennas distributed at different positions of the wearable device 101.

In one embodiment, the controller 150 may continuously measure the intensity of signals received through the first receiving antenna 111 while charging the battery. If the intensity of the signals received through the first receiving antenna 111 changes, the signals from the first to third receiving antennas 111, 112, and 113 may be received and compared again at this time. If the signal intensity from the one of the unselected second or third receiving antennas 112 or 113 is greater than the signal intensity from the selected first antenna 111, the unselected second or third receiving antenna 112 or 113 having the greater signal intensity is selected to receive power for continuing to charge the battery.

In accordance with another embodiment, after one of the antennas has been selected and during charging of the battery, the controller 150 may continuously measure the intensities of signals received through multiple antennas, e.g., all three of the first, second, and third receiving antennas 111, 112, and 113. If one of the unselected antennas has a signal intensity greater than the signal intensity from the selected antenna, the controller 150 may select the antenna having the greater signal intensity for purposes of receiving power to continue charging the battery.

In accordance with another embodiment, if the received signal intensity is reduced to less than a first reference level while power is received through the first receiving antenna 111 for charging the battery, the controller 150 may turn ON the second and third switches 122 and 123, may measure intensities of the signals received through the first to third receiving antennas 111, 112 and 113, and may compare the measured signal intensities with one another. Since the first switch 121 has been turned ON for charging the battery, there is no change in the switching state of the first switch 121. The first reference level may be a preset value taking into consideration, for example, the charging efficiency of the battery. The controller 150 may select the antenna receiving the greatest signal intensity among the first to third receiving antennas 111, 112, and 113, may turn ON only a switch connected to the selected antenna to continuously perform charging of the battery. For more efficient charging of the battery, another antenna may be selected.

A change in the measured signal intensities from the antennas may occur, for example, when the charging positions of the wearable device 101 change. For example, in the case where the wearable device 101 is a wrist-worn device, a user may move the wearable device 101 to a different orientation relative to the power supply unit 200. This may occur, for example, when the user picks up the device and then puts it back on or near the power supply unit 200.

The controller 150 may be connected to a battery pack 10 to achieve more efficient charging. The controller 150 may be implemented in logic which, for example, may include hardware, software, or both. When implemented at least partially in hardware, the controller 150 may be, for example, any one of a variety of integrated circuits including but not limited to an application-specific integrated circuit, a field-programmable gate array, a combination of logic gates, a system-on-chip, a microprocessor, a microcomputer unit (MCU), a microcontroller, a computer, or another type of processing or control circuit.

When implemented in at least partially in software, the controller 150 may include, for example, a memory or other storage device for storing code or instructions to be executed, for example, by the aforementioned processing or control circuits. The aforementioned processing or control circuits may be those described herein or one in addition to the elements described herein. Because the algorithms that form the basis of the methods (or operations of the processing or control circuits) are described in detail, the code or instructions for implementing the operations of the method embodiments may transform the control or processing circuits into a special-purpose processor for performing the functions, operations, and methods described herein.

The power supply unit 200 may include one or more transmitting antennas 210 for transmitting power to the first to third receiving antennas 111, 112, and 113 of the wearable device 101.

Figure 3:
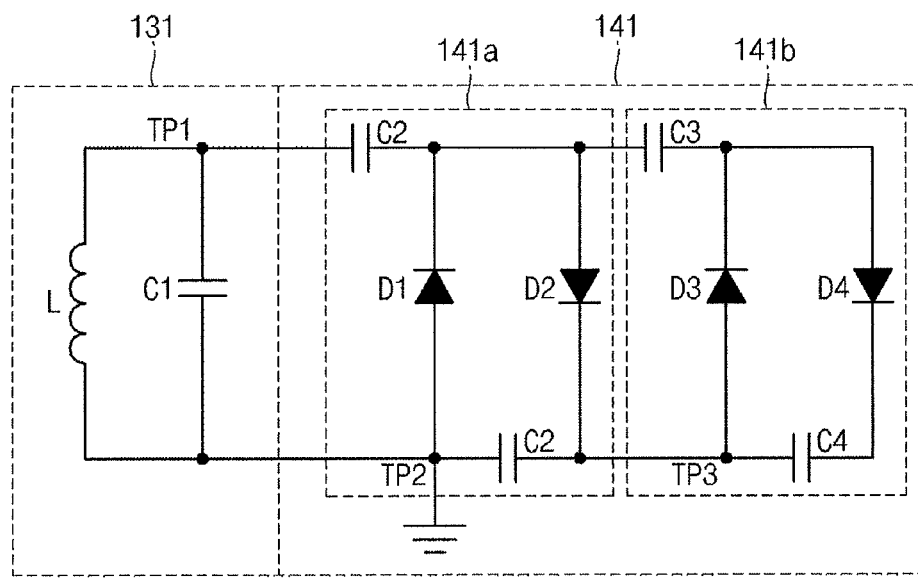
FIG. 3 illustrates an embodiment of antenna matching units and converters.

FIG. 3 illustrates an embodiment of antenna matching units and AC/DC converters. As shown in FIG. 3, each of the first to third antenna matching units 131, 132, and 133 include an inductor L and a first capacitor C1 connected in parallel. The first AC/DC converter 141 include a plurality of AC/DC conversion sub units 141a and 141b connected in parallel. Each of the AC/DC conversion sub units 141a and 141b includes a first AC/DC conversion sub unit 141a and a second AC/DC conversion sub unit 141b.

The first AC/DC conversion sub unit 141a includes a second capacitor C2, a first diode D1, a third capacitor C3, and a second diode D2. The second capacitor C2 has a first terminal connected to a first terminal of the first capacitor C and a second terminal connected to a cathode terminal of the first diode D1. An anode terminal of the first diode D1 is connected to a second terminal of the first capacitor C1 and a reference (e.g., ground) terminal. The third capacitor C3 has a first terminal connected to an anode terminal of the first diode D1 and a second terminal connected to a cathode terminal of the second diode D2. An anode terminal of the second diode D2 is connected to a second terminal of the second capacitor C2 and a cathode terminal of the first diode D1.

Like the first AC/DC conversion sub unit 141a, the second AC/DC conversion sub unit 141b may include a fourth capacitor C4, a third diode D3, a fifth capacitor C5, and a fourth diode D4. The third capacitor C3 has a first terminal connected to an anode terminal of the second diode D2 and a second terminal connected to a cathode terminal of the third diode D3. An anode terminal of the third diode D3 is connected to a cathode terminal of the second diode D2 and a first terminal of the fifth capacitor C5. A second terminal of the fifth capacitor C5 is connected to a cathode terminal of the fourth diode D4. An anode terminal of the fourth diode D4 is connected to a cathode terminal of the third diode D3. In FIG. 3, two AD/DC conversion sub units are illustrated. However, a different number of AC/DC conversion sub units that are connected in parallel may be included in another embodiment.

Figure 4A:
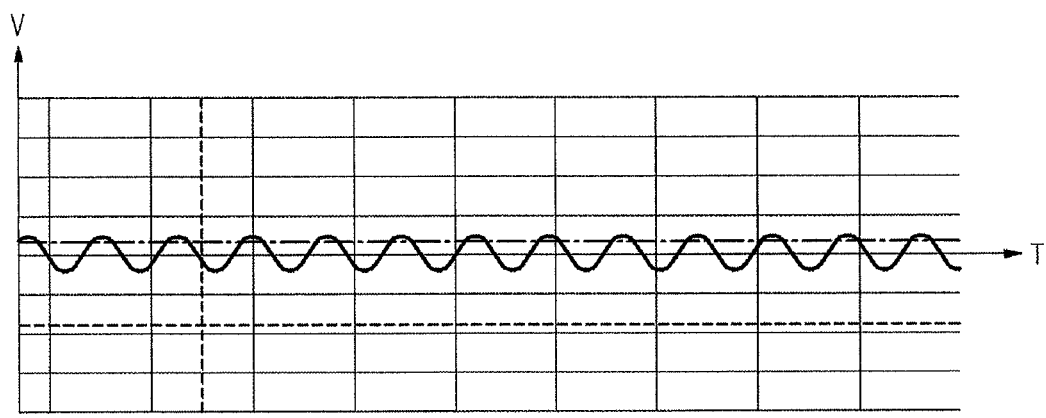
FIG. 4A to 4C illustrate signals received through an antenna at different times.

FIG. 4A is a graph illustrating an example of a signal received through the first receiving antenna 111 measured at point TP1 in FIG. 3. Referring to FIGS. 3 and 4A, an AC signal of about 9.8 V was detected at a point TP1.

Figure 4B:
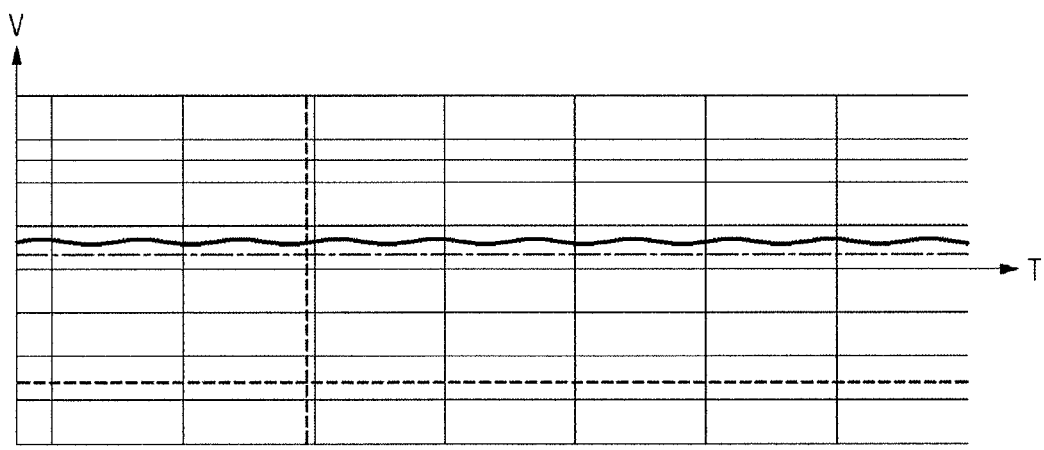

FIG. 4B is a graph illustrating an example of a signal received through the first receiving antenna 111 measured at a point TP2 in FIG. 3. Referring to FIGS. 3 and 4B, a DC signal of about 13.8 V was detected at a point TP2.

Figure 4C:
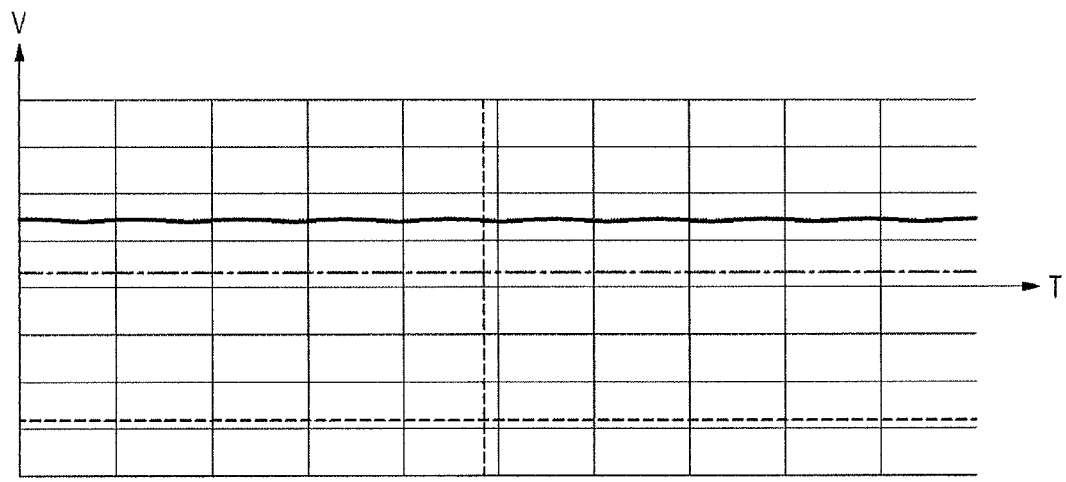

FIG. 4C is a graph illustrating an example of a signal received through the first receiving antenna 111 measured at a point TP3 in FIG. 3. Referring to FIGS. 3 and 4C, a DC signal of about 30.4 V was detected at a point TP3.

Figure 5A:
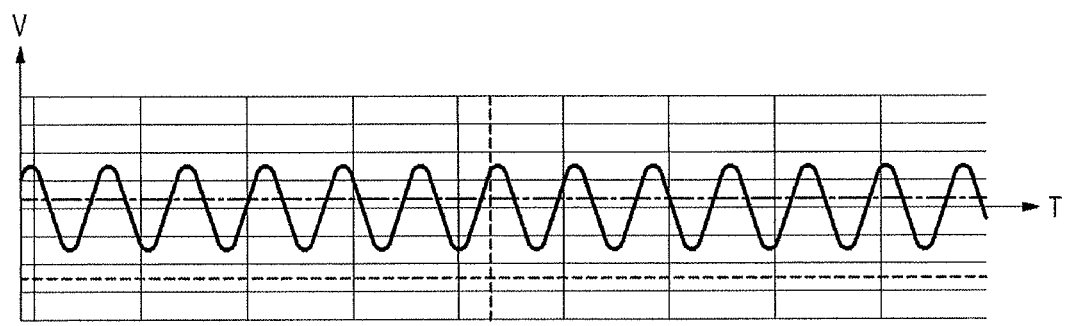
FIG. 5A to 5C illustrate signals received through another antenna at different times.

FIG. 5A is a graph illustrating an example of a signal received through a second receiving antenna 112 measured at the point TP1 in FIG. Referring to FIGS. 3 and 5A, an AC signal of about 14.6 V was detected at the point TP1.

Figure 5B:
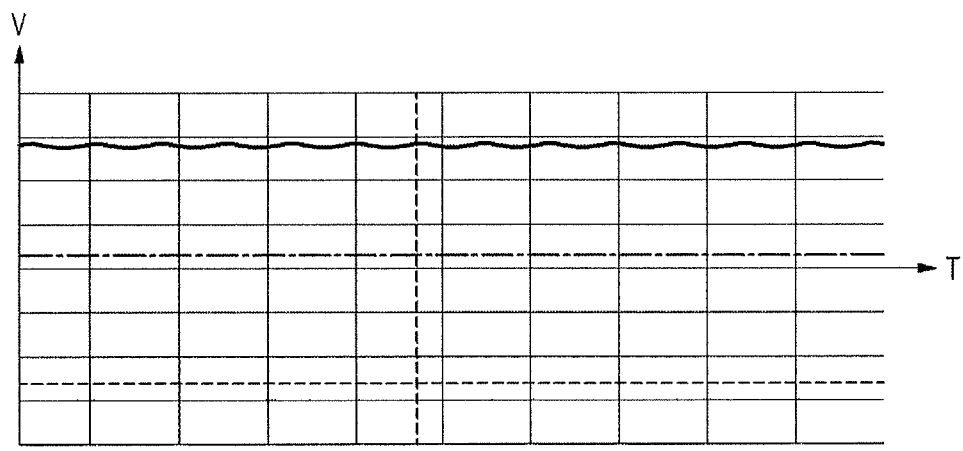

FIG. 5B is a graph illustrating an example of a signal received through the second receiving antenna 112 measured at the point TP2 in FIG. 3. Referring to FIGS. 3 and 5B, a DC signal of about 28.5 V was detected at the point TP2.

Figure 5C:
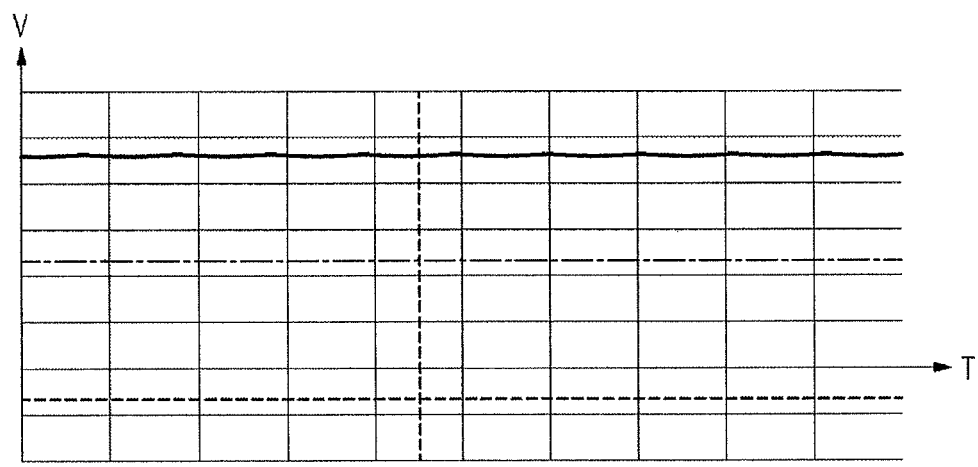

FIG. 5C is a graph illustrating an example of a signal received through a second receiving antenna 112 measured at the point TP3 in FIG. 3. Referring to FIGS. 3 and 5C, a DC signal of about 56.3 V was detected at the point TP3.

By way of summation and review, wireless recharging of a portable electronic device has been performed in a one-to-one electromagnetically inductive manner between a primary coil of the portable electronic device and a secondary coil of a charger. However, since portable electronic devices (and especially wearable portable devices) have many different structures (e.g., curved, bent, etc.), it is quite difficult to charge the device using the one-to-one electromagnetically inductive method. For example, when the primary coil of the portable electronic device is not sufficiently close to the secondary coil of the charger due to bend or curve in the device, charging efficiency may be lowered or charging may not be properly achieved.

In accordance with one or more of the aforementioned embodiments, since receiving antennas for wireless charging are mounted on various positions of a wearable device, a receiving antenna is selected which receives the greatest amount of power (e.g., closest to a power supply unit) to improve charging performance. The selection may be made irrespective of the direction in which a signal is received, thereby efficiently achieving wireless recharging of a battery for the electronic device.

In accordance with these or other embodiments, when a charging direction of the electronic device is changed, an antenna for receiving power is automatically reselected for continuing charging of the battery. As a result, wireless recharging of the battery of the electronic device may be stably achieved.

In accordance with these or other embodiments, a plurality of antennas may be simultaneously selected. In this case, power received from a plurality of antennas may be used for charging a battery of the device.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A wireless charging device, comprising:
a plurality of antennas to wirelessly receive power through electromagnetic induction, the antennas located at different positions of an electronic device and oriented in different directions;
a plurality of AC/DC converters connected to respective ones of the antennas, the AC/DC converters to convert AC signals from the antennas to DC signals; and
a controller to measure intensities of the converted signals from the AC/DC converters, compare the intensities, and select one of the antennas having a greater intensity for charging a battery,
wherein the antennas are at different positions along a single curved surface of the electronic device.

2. The device as claimed in claim 1, further comprising:
a plurality of antenna matching circuits connected between the antennas and the AC/DC converters, the antenna matching circuits to perform antenna impedance matching for receiving power based on the signals from the antennas.

3. The device as claimed in claim 2, further comprising:
a plurality of switches connected between the antennas and the antennas matching circuits.

4. The device as claimed in claim 3, wherein the controller is to control the switches to select the antenna having the greater intensity.

5. The device as claimed in claim 4, wherein the controller is to:
constantly measure signal intensity from the selected antenna while charging the battery, and
turn ON the switches of unselected ones of the antennas to measure the intensities of the signals from all of the antenna matching circuits when the signal intensity of the selected antenna changes, the controller to compare the measured intensities from the antenna matching circuits and to select one of the unselected ones of the antennas having the greater signal intensity based on the comparison.

6. The device as claimed in claim 2, wherein each of the antenna matching circuits includes an inductor connected in parallel to a first capacitor.

7. The device as claimed in claim 6, wherein:
each of the AC/DC converters includes a plurality of AC/DC conversion sub circuits connected in parallel, and
each of the AC/DC conversion sub circuits includes:
a second capacitor having a first terminal connected to a first terminal of the first capacitor;
a first diode having a cathode electrode connected to a second terminal of the second capacitor and an anode electrode connected to a second terminal of the first capacitor and a reference terminal;
a third capacitor having a first terminal connected to the anode electrode of the first diode; and
a second diode having a cathode electrode connected to a second terminal of the third capacitor and an anode electrode connected to the cathode electrode connected to the first diode.

8. The device as claimed in claim 1, wherein each of the antennas is flexible printed circuit board type.

9. An apparatus, comprising:
an interface; and
a controller to receive power signals from a plurality of electromagnetic induction antennas through the interface, the controller to select at least one antenna based on the power signals and to control charging of a battery of an electronic device based on the power signal from the at least one antenna, wherein the power signals from the antennas have different levels based on different positions of the antennas on the electronic device,
wherein the plurality of antennas are at different positions along a single curved surface of the electronic device.

10. The apparatus as claimed in claim 9, wherein the controller is to select only one of the antennas based on the power signals to control charging of the battery.

11. The apparatus as claimed in claim 9, wherein the controller is to simultaneously select more than one of the antennas based on the power signals to control charging of the battery.

12. The apparatus as claimed in claim 9, wherein the controller is to select another one of the antennas when the power signal of the at least one selected antenna falls below a predetermined level, the controller to control continued charging of the battery based on the power signal from the other selected antenna.

13. The apparatus as claimed in claim 9, wherein the controller is to:
monitor the power signals of the antennas during battery charging, and
select another one of the antennas when the level of power signal of the at least one selected antenna is lower than the level of the other one of the antennas, the controller to control continued charging of the battery based on the power signal from the other selected antenna.

14. The apparatus as claimed in claim 9, wherein the electronic device is a wearable electronic device.

15. The apparatus as claimed in claim 9, wherein the antennas are flexible printed circuit board antennas.

16. The apparatus as claimed in claim 9, wherein the apparatus is included in the electronic device.

17. An apparatus, comprising:
first logic to receive power signals from a plurality of electromagnetic induction antennas;
second logic to compare the power signals from the antennas; and
third logic to select at least one antenna based on the comparison, the third logic to control charging of a battery of an electronic device based on the power signal from the at least one antenna, wherein the power signals from the antennas have different levels based on different positions of the antennas on the electronic device,
wherein the plurality of antennas are at different positions along a single curved surface of the electronic device.

18. The apparatus as claimed in claim 17, wherein at least one of the first logic, the second logic, or the third logic is based on one or more instructions to be executed by a circuit.

19. The apparatus as claimed in claim 17, wherein after the third logic selects the at least one antenna:
the first logic is to receive power signals from the antennas,
the second logic is to compare the power signals from the antennas, and
the third logic is to selected a different one of the antennas based on the comparison, the third logic to control continued charging of the battery based on the power signal from the selected different one of the antennas.

* * * * *